(12) United States Patent
Liu et al.

(10) Patent No.: US 9,846,827 B2
(45) Date of Patent: Dec. 19, 2017

(54) IMAGE PRINTING METHOD AND PRINTER FOR SEGMENTING AN IMAGE TO CREATE FIRST DATA FILES AND FIRST MEMORY BLOCKS AND PRINTING EACH DATA FILE USING PRINT POSITION INFORMATION

(71) Applicants: Peking University Founder Group Co., Ltd., Beijing (CN); Peking University, Beijing (CN); Beijing Founder Electronics Co., Ltd., Beijing (CN)

(72) Inventors: Hongyu Liu, Beijing (CN); Weiping Huang, Beijing (CN)

(73) Assignees: PEKING UNIVERSITY FOUNDER GROUP CO., LTD., Beijing (CN); PEKING UNIVERSITY, Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 47 days.

(21) Appl. No.: 14/914,824

(22) PCT Filed: Nov. 8, 2013

(86) PCT No.: PCT/CN2013/086745
§ 371 (c)(1),
(2) Date: Feb. 26, 2016

(87) PCT Pub. No.: WO2015/027567
PCT Pub. Date: Mar. 5, 2015

(65) Prior Publication Data
US 2016/0210542 A1 Jul. 21, 2016

(30) Foreign Application Priority Data

Aug. 27, 2013 (CN) .......................... 2013 1 0378995

(51) Int. Cl.
*G06K 15/02* (2006.01)
*G06F 3/12* (2006.01)

(52) U.S. Cl.
CPC ......... *G06K 15/1886* (2013.01); *G06F 3/122* (2013.01); *G06F 3/128* (2013.01);
(Continued)

(58) Field of Classification Search
None
See application file for complete search history.

(56) References Cited

U.S. PATENT DOCUMENTS

2004/0252339 A1* 12/2004 Toda .................. G06F 3/1214
358/1.16
2009/0123071 A1* 5/2009 Iwasaki ............... G06K 9/2054
382/176
(Continued)

FOREIGN PATENT DOCUMENTS

EP 1359758 A1 11/2003
EP 1681656 A1 7/2006

*Primary Examiner* — Benny Q Tieu
*Assistant Examiner* — Haris Sabah
(74) *Attorney, Agent, or Firm* — Brinks Gilson & Lione

(57) ABSTRACT

An image printing method and printer is provided. The method comprises obtaining an original data file of an image to be printed from a database; dividing the original data file into a plurality of first data files and storing the first data files in a plurality of first memory blocks correspondingly; receiving an image printing request, the image printing request carrying first position information of the image to be printed; determining from its position information of the image to be printed second position information contained in the first position information, and filling a first data file corresponding to the second position information to a second memory block from the first memory block where the first data file is located through memory mapping mecha-
(Continued)

nism to form a second data file to be printed; and printing and outputting the second data file in the second memory block.

9 Claims, 3 Drawing Sheets

(52) U.S. Cl.
CPC .......... *G06F 3/1211* (2013.01); *G06F 3/1215* (2013.01); *G06F 3/1241* (2013.01); *G06F 3/1244* (2013.01); *G06F 3/1282* (2013.01); *G06K 15/1863* (2013.01)

(56) References Cited

U.S. PATENT DOCUMENTS

| | | | |
|---|---|---|---|
| 2010/0171999 A1* | 7/2010 | Namikata | H04N 1/32101 358/530 |
| 2010/0238504 A1* | 9/2010 | Kanno | G06F 3/122 358/1.15 |
| 2010/0321401 A1 | 12/2010 | Engelbert et al. | |

* cited by examiner

IMAGE PRINTING METHOD AND PRINTER FOR SEGMENTING AN IMAGE TO CREATE FIRST DATA FILES AND FIRST MEMORY BLOCKS AND PRINTING EACH DATA FILE USING PRINT POSITION INFORMATION

CROSS-REFERENCE TO RELATED APPLICATIONS

This application is a national application of PCT/CN2013/086745, filed on Nov. 8, 2013, which application claims a right of priority to Chinese Patent Application No. 201310378995.0, filed Aug. 27, 2013, both of which are incorporated herein by reference in their entirety.

FIELD OF THE INVENTION

This invention relates to the field of printing technology, particularly, to an image printing method and a printer.

DESCRIPTION OF THE RELATED ART

With the rapid development of digital printing technology, digital printing technology has been applied in more and more fields, in which it is desirable to print oversized images.

In the prior art, a method for printing an oversized image comprises processes of: first of all, dividing the image into multiple small image blocks and storing them into a hard disk, then screening each image block respectively, generating a dot matrix, transmitting data to nozzles, and printing etc. Because the control software of existing inkjet digital printers may only access a limited size of memory, the above process steps may be performed on a small block of image each time, and a next block of image may be read out from the hard disk to continue the above processes only after the printing of the previous image block has been completed, so that this method causes a long period of time consumed during the printing process, thereby resulting in lower printing efficiency.

The description in this specification for any techniques in the prior art should not be taken as an acknowledgement or any form of suggestion that this information forms the prior art already known to a person skilled in the art before the filing date of this application or the priority date of any claim of this application.

SUMMARY OF THE INVENTION

An image printing method and a printer are provided in this invention, which may solve the technical problem in the prior art of a long period of time consumed during the printing of an oversized image and low printing efficiency.

On one aspect, an image printing method is provided in an embodiment of this invention, comprising:
  obtaining an original data file of an image to be printed from a database;
  according to a size of the original data file, dividing the original data file into a plurality of first data files and storing the first data files in a plurality of first memory blocks correspondingly;
  receiving an image printing request, the image printing request carrying first position information of the image to be printed;
  for each data file among the plurality of first data files, determining from its position information of the image to be printed second position information contained in the first position information, and filling a first data file corresponding to the second position information to a second memory block from the first memory block where the first data file is located through memory mapping mechanism to form a second data file to be printed; and
  printing and outputting the second data file in the second memory block.

On another aspect, a printer is provided in an embodiment of this invention, comprising: an acquisition module, a division module, a reception module, a mapping module and a printing module, wherein
  the acquisition module is configured to obtain an original data file of an image to be printed from a database;
  the division module is configured to, according to the size of the original data file, divide the original data file into a plurality of first data files and store the first data files in a plurality of first memory blocks correspondingly;
  the reception module is configured to receive an image printing request, the image printing request carrying first position information of the image to be printed;
  the mapping module is configured to, for each first data file among the plurality of first data files, determine from its position information of the image to be printed second position information contained in the first position information, and fill a first data file corresponding to the second position information to a second memory block from the first memory block where the first data file is located through memory mapping mechanism to form a second data file to be printed; and
  the printing module is configured to print and output the second data file in the second memory block.

With the image printing method and printer provided in this invention, an original data file of an image to be printed is divided into a plurality of first data files according to a size of the original data file and the first data files are stored in a plurality of first memory blocks correspondingly; an image printing request is received, the image printing request carrying first position information of the image to be printed; for each first data file among the plurality of first data files, second position information contained in the first position information is determined from its position information of the image to be printed, and a first data file corresponding to the second position information is filled to a second memory block from the first memory block where the first data file is located through memory mapping mechanism to form a second data file to be printed, and the second data file in the second memory block is printed and outputted, thereby the printing efficiency is improved.

DESCRIPTION OF THE EMBODIMENTS

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

Meanwhile, it should be appreciated that, for the convenience of description, various parts shown in those drawings are not necessarily drawn on scale.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the allowed specification where appropriate.

In all of the examples illustrated and discussed herein, any specific values should be interpreted to be illustrative only and non-limiting. Thus, other examples of the exemplary embodiments could have different values.

Figure 1:
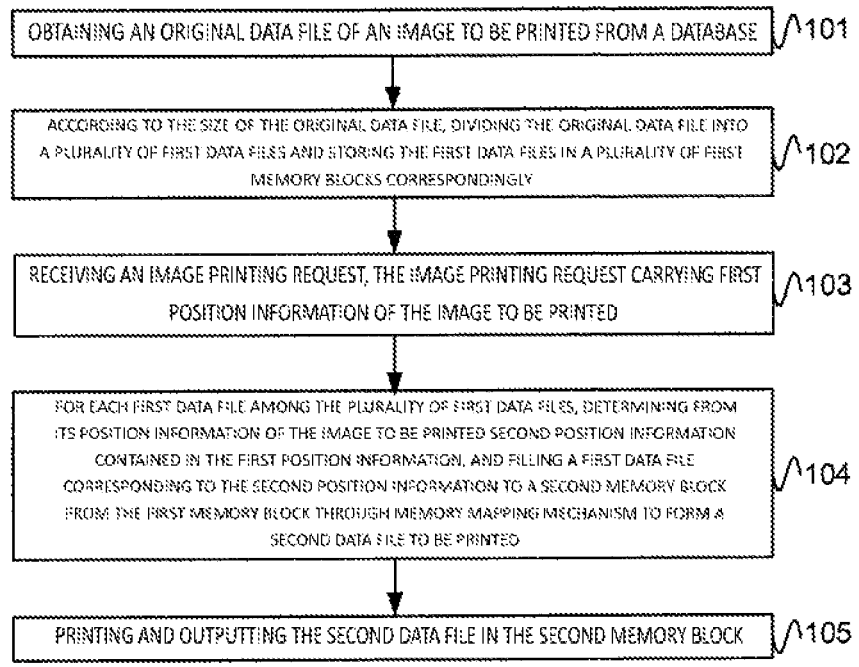
FIG. 1 is a flowchart of an image printing method provided in an embodiment of this invention.

FIG. 1 is a flowchart of one embodiment of an image printing method provided in this invention. As shown in FIG. 1, the subject for carrying out the following steps may be a digital printer having an image printing function. As shown in FIG. 1, the image printing method particularly comprises the following steps.

S101: obtaining an original data file of an image to be printed from a database.

Generally, before printing an image on a digital printer, first of all, an original data file of an image to be printed is obtained from a fixed hard disk. The original data file is a data file in a particular format that may be printed directly and obtained through preprocessing of an existing image file. In this application, the hard disk storing the original data file of the image may be considered as the database described above.

S102: according to a size of the original data file, dividing the original data file into a plurality of first data files and storing the first data files in a plurality of first memory blocks correspondingly.

According to the size of the original data file, the original data file may be divided into a plurality of first data files according to the size, coordinates or data storing sequence of the original data file. According to the number and size of the first data files generated after the division, a plurality of first memory blocks in an appropriate size are allocated. The plurality of first data files are correspondingly stored in the plurality of first memory blocks.

S103: receiving an image printing request, the image printing request carrying first position information of the image to be printed.

The image printing request is configured to instruct a printer or printing device to perform an image printing process. The image printing request carries first position information, which identifies a particular print position among all position information corresponding to the image to be printed. For example, the image to be printed may be a square image with a length of side of 1 m, and a current position to be printed is the position of the ¼ image portion on the upper left corner of the image, the position information corresponding to this ¼ image portion may be transmitted to a corresponding printer via an image printing request, to instruct the printer to perform the request of printing the ¼ image portion on the upper left corner of the image. The first position information described above is the position information corresponding to the ¼ image portion in this example.

S104: for each first data file among the plurality of first data files, determining from its position information of the image to be printed second position information contained in the first position information, and filling a first data file corresponding to the second position information to a second memory block from the first memory block where the first data file is located through memory mapping mechanism to form a second data file to be printed.

For each first data file among the plurality of first data files described above, according to the first position information in the received image printing request, at first, it is determined whether position information corresponding to the first data file includes position information contained in the first position information, and position information within the position information corresponding to the first data file and contained in the first position information may be considered as the second position information. For example, if the position information corresponding to a current first data file is a position area corresponding to the ½ portion on the upper half of the image to be printed, and the first position information is a position corresponding to the ½ portion on the left half of the image to be printed, position information corresponding to the ¼ portion in the upper left corner of the image to be printed may be considered as the second position information described above.

After the second position information corresponding to each of the first data files has been determined, the first data file corresponding to each second position information is filled to a second memory block from the first memory block where the first data file is located through memory mapping mechanism, and during the filling process, data files and their positions in the image to be printed still have an one-to-one correspondence relationship. After all data files corresponding to the first position information of the image to be printed have been filled in a second memory block, a second data file of the image to be printed described above is formed.

S105: printing and outputting the second data file in the second memory block.

After all of the first data files corresponding to the first position information of the current image to be printed have been filled to the second memory block through memory mapping mechanism from the plurality of first memory blocks described above to form the second data file, data in the second data file in the second memory block may be transmitted to printer nozzles using a specific printing technique for printing. Because data in the second memory block is sequentially stored in correspondence to its position in the image to be printed, the printed image is guaranteed to be consistent with the content of the original image. Further, it is not necessary to repeatedly read image data files from the hard disk, so the printing time is reduced.

A method for printing an oversized image is provided in this invention. An original data file of an image to be printed is divided into a plurality of first data files according to a size of the original data file and the first data files are stored in a plurality of first memory blocks correspondingly; an image printing request is received, the image printing request carrying first position information of the image to be printed; for each first data file among the plurality of first data files, second position information contained in the first position information is determined from its position information of the image to be printed, and a first data file corresponding to the second position information is filled to a second memory block from the first memory block where the first data file is located through memory mapping mechanism to form a second data file to be printed; and the second data file in the second memory block is then printed and outputted, thereby the printing efficiency is improved.

Figure 2:
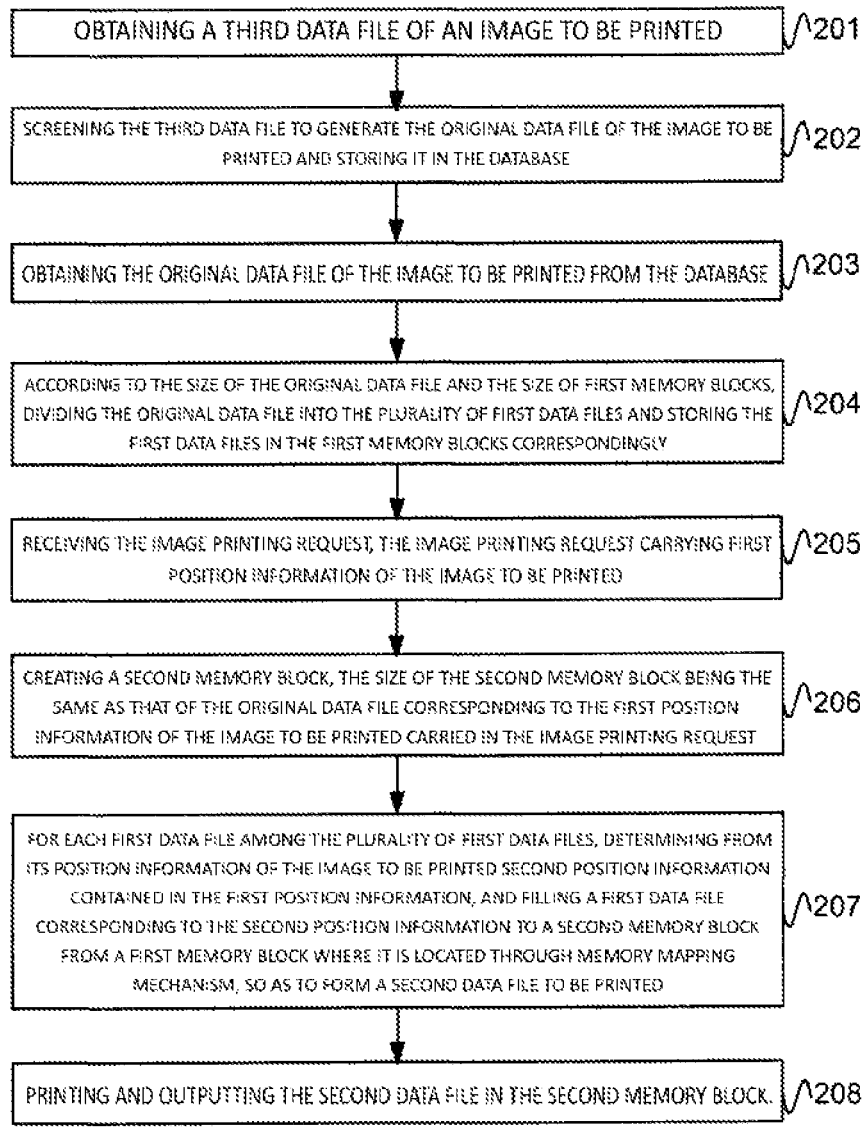
FIG. 2 is a flowchart of an image printing method provided in another embodiment of this invention.

FIG. 2 is a flowchart of another embodiment of a method for an oversized image provided in this invention, which provides another specific implementation. As shown in FIG. 2, the method particularly comprises the following steps.

S201: obtaining a third data file of an image to be printed.

The third data file of the image to be printed may be a file in any image format, such as the image file with an extension name of JPEG, TIFF, RAW, etc.

S202: screening the third data file to generate an original data file of the image to be printed and storing it in a database.

The screening of the image file pertains to the prior art and will not be described in detail herein. In this application, because the images subjected to this process are all oversized images, i.e., image files are generally in a size over 4 GB, in view of the limitation on the size of the image file in the screening process in the prior art, in this step, the image division method of step 102 may be performed on the third data file to divide the third data file into a plurality of small image blocks before screening sequentially, and then store data files corresponding to those small image blocks generated after each screening process in the database, so as to form the original data file of the image to be printed described above.

S203: obtaining the original data file of the image to be printed from the database. The details of this step may be referred to the content of step 101.

S204: according to the size of the original data file and the size of first memory blocks, dividing the original data file into a plurality of first data files and storing the first data files in the first memory blocks correspondingly. The details of this step may be referred to the content of step 102.

Particularly, the printer control programs in existing printers generally perform screening directly after reading an image file to be printed from a hard disk, generate dot matrix data, and transmit the data to nozzles for printing. This is because existing printer control programs are only allowed to access a limited memory space each time. In this application, in order to avoid this limitation, after the third data file is screened to generate the original data file, the original data file is first divided into a plurality of first data files according to the size of the image to be printed or coordinate positions, and each of first data files is synchronously read and stored in a first memory block. Preferably, the size of each of the first data files may be selected as the same as that of the first memory block.

The particular process may be as follows. After completing the screening process of the third data file, according to the size of the original data file and the size of memory accessible to a predetermined auxiliary application program, a printer control program in a printer servers as a control program to determine the number of the auxiliary application programs to be launched; then a storage path of the data file and information about an image such as its position and size are sent to the corresponding auxiliary application programs; according to the above information sent from the control program, each auxiliary application program obtains corresponding data from the data file described above and store it in a first memory block reserved for the respective auxiliary application program.

S205: receiving an image printing request, the image printing request carrying first position information of the image to be printed. The details of this step may be referred to the content of step 103.

S206: creating a second memory block, the size of the second memory block being the same as that of the original data file corresponding to the first position information of the image to be printed carried in the image printing request.

According to the size of the original data file corresponding to the first position information of the image to be printed carried in the obtained image printing request, the control program in the printer described above allocates a second memory block different from the storage area of the first memory block, which is configured for the transmission of the data file in the second memory block by the control program.

S207: for each first data file among the plurality of first data files, determining from its position information of the image to be printed second position information contained in the first position information, and filling a first data file corresponding to the second position information to a second memory block from a first memory block where it is located through memory mapping mechanism, so as to form a second data file to be printed. The details of this step may be referred to the content of step 104.

The position information of the image to be printed comprises coordinates of upper left corners of rectangular images in the image to be printed and lengths and widths of the rectangular images. In this application, a coordinate system is provided on the plane of the image to be printed in accordance with the demand of human visual appreciation. In the rectangular images in the image to be printed corresponding to all of above data files (including first data file and second data file), the long sides and short sides of the rectangles are parallel to the X axis and Y axis of the coordinate system respectively wherein a side connecting to the upper left corner and extending along the X axis direction is considered as the long side of the rectangle, and a side connecting to the upper left corner and extending along the Y axis direction is considered as the short side of the rectangle.

Particularly, the above process may comprise the follow steps. A printer control program serving as a control program in the printer transmits an identifier of a second memory block and the first position information described above to various auxiliary application programs. According to the received identifier of the second memory block, the various auxiliary application programs obtain access to the second data block through the memory mapping mechanism, and the position information contained in the first position information of position information corresponding to the first data files stored in the local first memory blocks is considered as the second position information. A first data file corresponding to the second position information is filled in the second memory block.

S208: printing and outputting the second data file in the second memory block. The details of this step may be referred to the content of step 105.

Particularly, after the various auxiliary application programs described above have filled first data files corresponding to the second position information stored in the first memory block to the second memory block, a completion message is sent to the control program to notify the control program of a next operation. After receiving the above message sent from the various auxiliary application programs, the control program transmits data in the second data file to printer nozzles for printing.

With the method for printing an oversized image provided in this invention, through the following steps, the printing efficiency is improved: dividing an original data file of an image to be printed into a plurality of first data files according to a size of the original data file and storing the first data files in a plurality of first memory blocks correspondingly; receiving an image printing request, the image printing request carrying first position information of the image to be printed; for each data file among the plurality of first data files, determining from its position information of the image to be printed second position information contained in the first position information, and filling a first data file corresponding to the second position information to a second memory block from the first memory block where the first data file is located through memory mapping mechanism to form a second data file to be printed, and then printing and outputting the second data file in the second memory block.

It can be understood by those skilled in the art that all or part of the steps of the method specified in any embodiment of the present invention may be implemented by a program instructing relevant hardware. The program may be stored in a computer readable storage medium. When the program runs, the program executes the steps of the method specified in any embodiment above. The storage medium may be any medium capable of storing program codes, such as ROM, RAM, magnetic disk, or CD-ROM.

Figure 3:
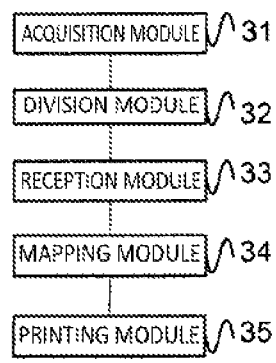
FIG. 3 is a schematic structure diagram of an embodiment of the printer provided in this invention.

FIG. 3 is a schematic structure diagram of an embodiment of a printer provided in this invention. The structure shown in this schematic diagram may execute steps of the method for printing an oversized image provided in the embodiment shown in FIG. 1. As shown in FIG. 3, the printer comprises an acquisition module 31, a division module 32, a reception module 33, a mapping module 34 and a printing module 35, wherein:

the acquisition module 31 is configured to obtain an original data file of an image to be printed from a database;

the division module 32 is configured to, according to a size of the original data file, divide the original data file into a plurality of first data files and store the first data files in a plurality of first memory blocks correspondingly;

the reception module 33 is configured to receive an image printing request, the image printing request carrying first position information of the image to be printed;

the mapping module 34 is configured to, for each first data file among the plurality of first data files, determine from its position information of the image to be printed second position information contained in the first position information, and fill a first data file corresponding to the second position information to a second memory block from the first memory block where the first data file is located through memory mapping to form a second data file to be printed; and the printing module 35 is configured to print and output the second data file in the second memory block.

Particularly, the process of printing an oversized image on the printer provided in this embodiment comprises the following steps.

The acquisition module 31 obtains an original data file of an image to be printed from a database. The details of this step may be referred to the content of step 101. According to a size of the original data file, the division module 32 divides the original data file into a plurality of first data files and stores the first data files in a plurality of first memory blocks correspondingly. The details of this step may be referred to the content of step 102. The reception module 33 receives an image printing request, the image printing request carrying first position information of the image to be printed. The details of this step may be referred to the content of step 103. For each first data file among the plurality of first data files divided by the division module 32, the mapping module 34 determines from its position information of the image to be printed second position information contained in the first position information, and fills a first data file corresponding to the second position information to a second memory block from the first memory block where the first data file is located through memory mapping mechanism to form a second data file to be printed. The details of this step may be referred to the content of step 104. The printing module 35 prints and output the second data file in the second memory block. The details of this step may be referred to the content of step 105.

With the printer provided in this invention, through the following operations, the printing efficiency is improved: dividing an original data file of an image to be printed into a plurality of first data files according to a size of the original data file and storing the first data files in a plurality of first memory blocks correspondingly; receiving an image printing request, the image printing request carrying first position information of the image to be printed; for each first data file among the plurality of first data files, determining from its position information of the image to be printed second position information contained in the first position information, and filling a first data file corresponding to the second position information to a second memory block from the first memory block where the first data file is located through memory mapping mechanism to form a second data file to be printed, and then printing and outputting the second data file in the second memory block.

Figure 4:
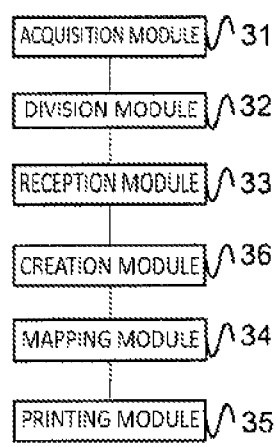
FIG. 4 is a schematic structure diagram of another embodiment of the printer provided in this invention.

FIG. 4 is a schematic structure diagram of another embodiment of a printer provided in this invention. The structure shown in this schematic structure diagram is another particular implementation of the embodiment shown in FIG. 3, which may execute the steps of the method shown in FIG. 2. As shown in FIG. 4, on the basis of the structure and function of the embodiment shown in FIG. 3, this printer further comprises a creation module 36, wherein:

the division module 32 is further configured to, according to the size of the original data file and the size of the first memory block, divide the original data file into a plurality of first data files, the size of each of the first data files being the same as that of the first memory block;

the acquisition module 31 is further configured to obtain a third data file of the image to be printed, screen the third data file to generate the original data file of the image to be printed, and store it in the database;

the creation module 36 is configured to create a second memory block, the size of the second memory block being the same as that of the original data file corresponding to the first position information of the image to be printed that is carried in the image printing request.

Particularly, the process of printing an oversized image by the printer provided in this invention comprises the following steps.

The acquisition module 31 obtains a third data file of an image to be printed, screens the third data file to generate an original data file of the image to be printed and stores it in the database described above. The details of this process may be referred to the content of steps 201~202.

The acquisition module 31 obtains the original data file of the image to be printed from the database. The details of this process may be referred to the content of step 203.

According to the size of the original data file and the sizes of first memory blocks, the division module 32 divides the original data file into a plurality of first data files and stores the first data files in the first memory blocks correspondingly. The details of this process may be referred to the content of step 204.

The reception module 33 receives an image printing request, the image printing request carrying first position information of the image to be printed. The details of this process may be referred to the content of step 205.

The creation module 36 creates a second memory block, the size of the second memory block being the same as that of the original data file corresponding to the first position information of the image to be printed carried in the image printing request. The details of this process may be referred to the content of step 206.

For each first data file among the plurality of first data files, the mapping module 34 determines from its position information of the image to be printed second position information contained in the first position information, and fills a first data file corresponding to the second position information to a second memory block from a first memory block where it is located through memory mapping mechanism, so as to form a second data file to be printed. The details of this process may be referred to the content of step 207.

The printing module 35 prints and outputted the second data file in the second memory block. The details of this process may be referred to the content of step 208.

With the printer provided in this invention, through the following operations, the printing efficiency is improved: dividing an original data file of an image to be printed into a plurality of first data files according to a size of the original data file and storing the first data files in a plurality of first memory blocks correspondingly; receiving an image printing request, the image printing request carrying first position information of the image to be printed; for each data file among the plurality of first data files, determining from its position information of the image to be printed second position information contained in the first position information, and filling a first data file corresponding to the second position information to a second memory block from the first memory block where the first data file is located through memory mapping mechanism to form a second data file to be printed, and then printing and outputting the second data file in the second memory block.

This disclosure also provides one or more computer readable mediums having stored thereon computer-executable instructions that when executed by a computer perform an image printing method, comprising: obtaining an original data file of an image to be printed from a database; according to a size of the original data file, dividing the original data file into a plurality of first data files and storing the first data files in a plurality of first memory blocks correspondingly; receiving an image printing request, the image printing request carrying first position information of the image to be printed; for each first data file among the plurality of first data files, determining from its position information of the image to be printed second position information contained in the first position information, and filling a first data file corresponding to the second position information to a second memory block from the first memory block where the first data file is located through memory mapping mechanism to form a second data file to be printed; and printing and outputting the second data file in the second memory block.

This disclosure also provides a computer comprising one or more computer readable mediums having stored thereon computer-executable instructions that when executed by the computer perform the image printing method described above.

Exemplary Operating Environment

The computer or computing device as described herein comprises hardware, including one or more processors or processing units, system memory and some types of computer readable media. By way of example and not limitation, computer readable media comprise computer storage media and communication media. Computer storage media comprises volatile or non-volatile, removable or non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may use one or more remote computers, such as logical connections to remote computers operated in a networked environment. Although various embodiments of the present disclosure are described in the context of the exemplary computing system environment, various embodiments of the present disclosure may be used with numerous other general purpose or application specific computing system environments or configurations. The computing system environment is not intended for limiting any aspect of the scope of use or functionality of the invention. In addition, the computer environment should not be interpreted as depending on or requiring any one or combination of components shown in the exemplary operating environment. Well-known examples of the computing systems, the environment and/or configurations suitable for all aspects of the present disclosure include, but are not limited to: personal computers, server computers, handheld or laptop devices, multiprocessor systems, microprocessor-based systems, set top boxes, programmable consumer electronics, mobile phone, network PC, minicomputers, mainframe computers, distributed computing environments including any one of the above systems or devices, and so on.

Various embodiments of the invention may be described in a general context of computer executable instructions such as program modules executed on one or more computers or other devices. The computer-executable instructions may be organized into one or more computer-executable components or modules as software. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

Finally, it should be noted that: the above embodiment only used to illustrate the technical solution of the present invention, rather than limit it; despite reference to the aforementioned embodiments to make a detailed description for the present invention, the ordinary technical personnel in this field should understand that: they can still amend the technical solution recited in the foregoing embodiment, or make equivalent replacements to some or all of the technical features; However, the modifying or replacing, do not make the nature of the corresponding technical solutions depart from the scope of the technical solutions of the embodiments in the present invention.

What is claimed is:

1. An image printing method characterized in comprising:
   obtaining an original data file of an image to be printed from a database;
   according to a size of the original data file, dividing the original data file into a plurality of first data files and storing the first data files in a plurality of first memory blocks correspondingly;
   receiving an image printing request, the image printing request carrying first position information of the image to be printed;
   for each first data file among the plurality of first data files, determining from its position information of the image to be printed second position information contained in the first position information, and filling a first data file corresponding to the second position information to a second memory block from the first memory block where the first data file is located through memory mapping mechanism to form a second data file to be printed; and
   printing and outputting the second data file in the second memory block,
   wherein before obtaining the original data file of the image to be printed from the database, the method further comprises:
   obtaining a third data file of the image to be printed; and
   dividing the third data file into a plurality of data files, screening the divided data file to generate the original data file of the image to be printed and storing it in the database.

2. The method of claim 1, characterized in that, according to the size of the original data file, dividing the original data file into the plurality of first data files comprises:
   according to the size of the original data file and the size of the first memory block, dividing the original data file into the plurality of first data files, the size of each of the first data files being the same as the size of the first memory block.

3. The method of claim 1, characterized in that, before obtaining the original data file of the image to be printed from the database, further comprising:
   obtaining a third data file of the image to be printed; and
   screening the third data file to generate the original data file of the image to be printed and storing it in the database.

4. The method of claim 3, characterized in that after receiving the image printing request, further comprising:
   creating the second memory block, the size of the second memory block being the same as that of the original data file corresponding to the first position information of the image to be printed carried in the image printing request.

5. The method of claim 4, characterized in that the position information of the image to be printed comprises coordinates of upper left corners of rectangular images in the image to be printed and lengths and widths of the rectangular images.

6. A printer comprising:
   a processor; and
   a memory having instructions thereon, which, when executed by the processor, cause the processor to perform operations of:
   obtaining an original data file of an image to be printed from a database;
   according to a size of the original data file, dividing the original data file into a plurality of first data files and storing the first data files in a plurality of first memory blocks correspondingly;
   receiving an image printing request, the image printing request carrying first position information of the image to be printed;
   for each first data file among the plurality of first data files, determining from its position information of the image to be printed second position information contained in the first position information, and filling a first data file corresponding to the second position information to a second memory block from the first memory block where the first data file is located through memory mapping mechanism to form a second data file to be printed;
   printing and outputting the second data file in the second memory block,
   wherein the instructions, when executed by the processor, further cause the processor to perform operations of:
   before obtaining the original data file of the image to be printed from the database:
   obtaining a third data file of the image to be printed; and
   dividing the third data file into a plurality of data files, screening the divided data file to generate the original data file of the image to be printed and storing it in the database.

7. The printer of claim 6, wherein the instructions, when executed by the processor, further cause the processor to perform operations of:
   according to the size of the original data file and the size of the first memory block, dividing the original data file into the plurality of first data files, the size of each of the first data files being the same as the size of the first memory block.

8. The printer of claim 6, wherein the instructions, when executed by the processor, further cause the processor to perform operations of:
   creating the second memory block, the size of the second memory block being the same as that of the original data file corresponding to the first position information of the image to be printed carried in the image printing request.

9. The printer of claim 8, wherein the position information of the image to be printed comprises coordinates of upper left corners of rectangular images in the image to be printed and lengths and widths of the rectangular images.

* * * * *